United States Patent [19]

Furuta et al.

[11] Patent Number: 5,631,691
[45] Date of Patent: May 20, 1997

[54] IMAGE FORMING APPARATUS

[75] Inventors: Hideya Furuta, Yokohama; Yoshihiro Sakai, Tokyo; Kazushige Taguchi, Warabi; Mitsuru Mamizuka, Tokyo, all of Japan

[73] Assignee: Ricoh Company, Ltd., Tokyo, Japan

[21] Appl. No.: 5,564

[22] Filed: Jan. 19, 1993

[30] Foreign Application Priority Data

Jan. 20, 1992 [JP] Japan ................................ 4-007624

[51] Int. Cl.⁶ ................................ B41J 2/385; B41J 2/47; B41J 2/435; G03G 13/04
[52] U.S. Cl. ........................ 347/235; 347/250; 347/248; 347/234; 347/249
[58] Field of Search ................ 355/271, 10; 358/451; 346/160; 347/116, 132, 250, 235, 248, 234, 249

[56] References Cited

U.S. PATENT DOCUMENTS

| | | | |
|---|---|---|---|
| 4,977,414 | 12/1990 | Shimada et al. | 346/154 |
| 4,992,884 | 2/1991 | Sakata | 358/401 |
| 5,027,158 | 6/1991 | Tompkins et al. | 355/271 |
| 5,367,363 | 11/1994 | Kai et al. | 355/210 |

*Primary Examiner*—Benjamin R. Fuller
*Assistant Examiner*—Raquel Yvette Gordon
*Attorney, Agent, or Firm*—Oblon, Spivak, McClelland, Maier & Neustadt, P.C.

[57] ABSTRACT

An image forming apparatus has an image scanner, a sensor for determining that the image sensor has scanned the front edge of a document, and a controller using main scanning line synchronizing signals and an output signal of the sensor as reference signals. In response to the reference signals, the controller causes at least a writing unit to start writing each image data of particular color and causes a transfer medium driving circuit to start driving a transfer medium. The apparatus allows image components of different colors to be transferred to the transfer medium one above the other in accurate registration.

7 Claims, 11 Drawing Sheets

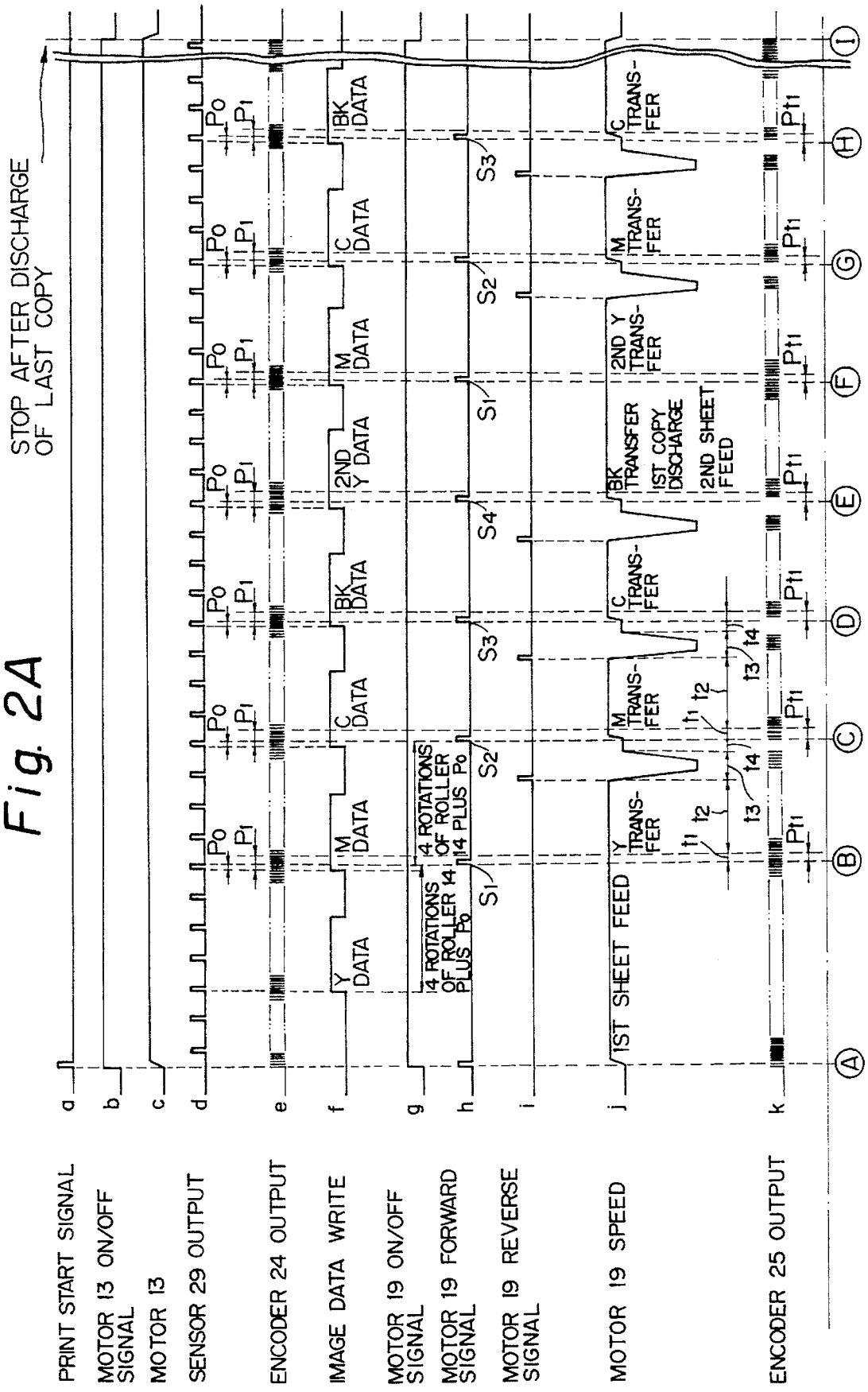

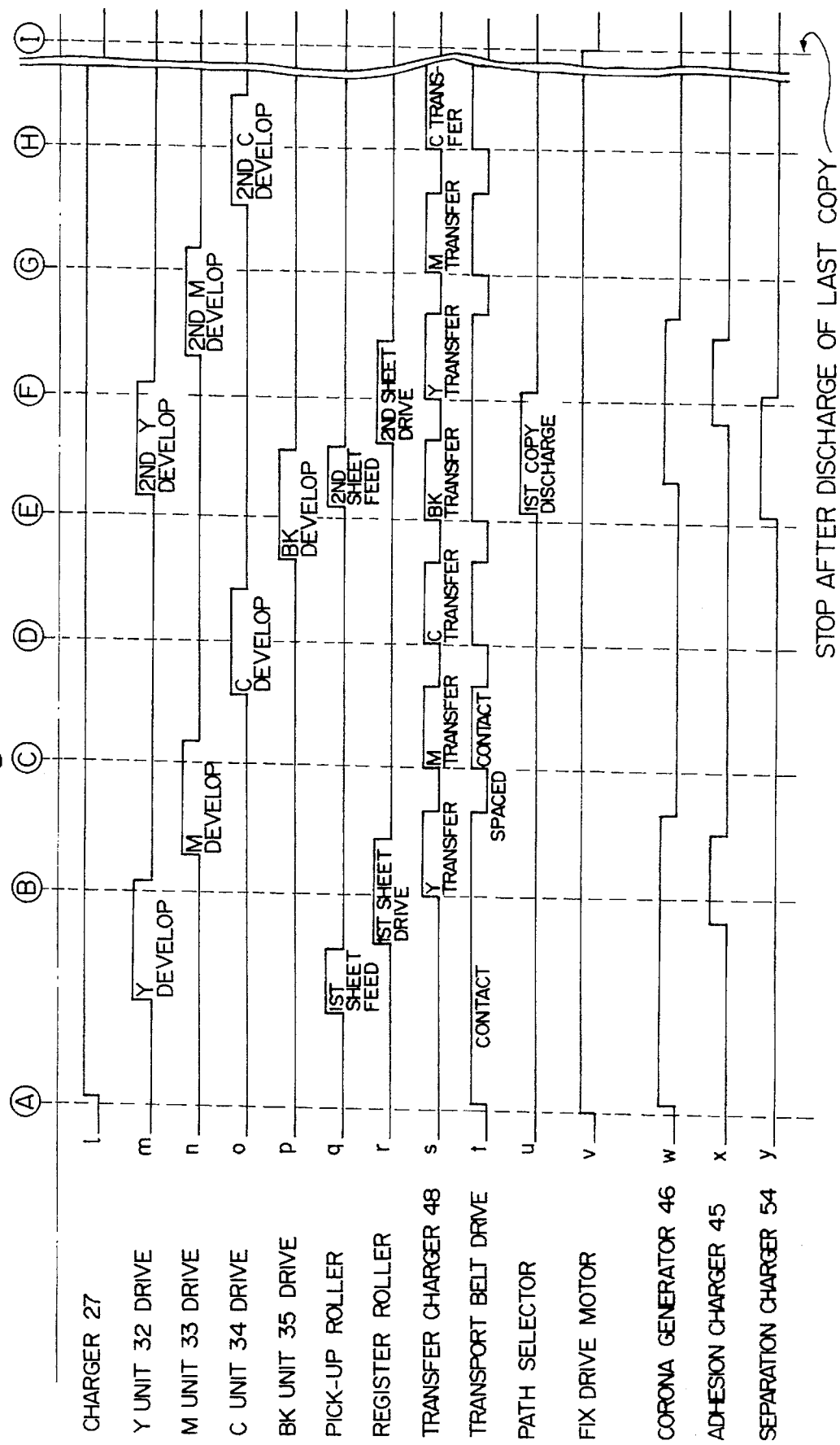

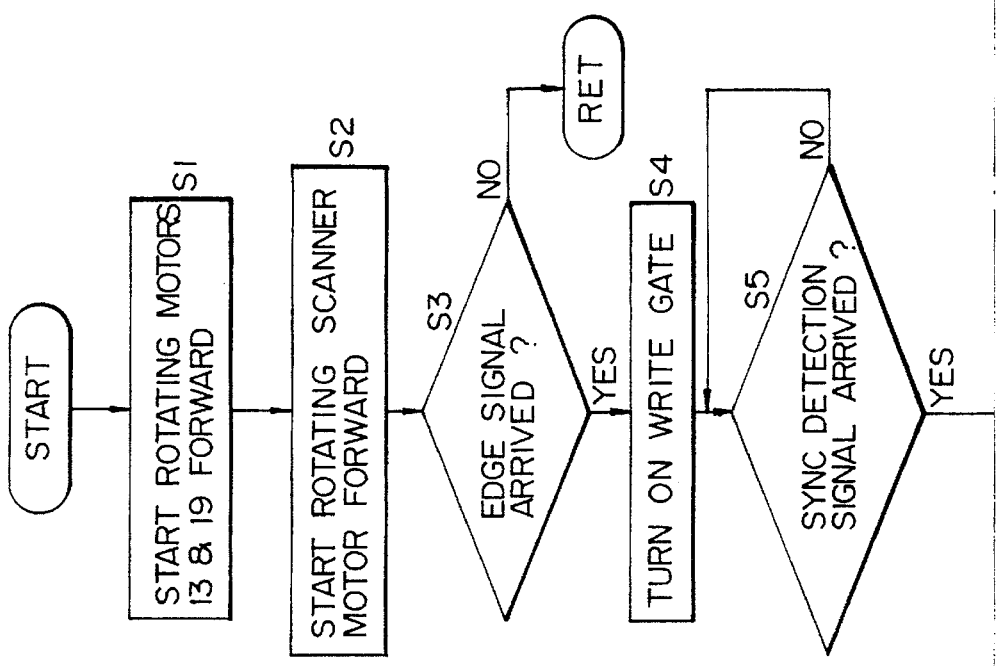

IMAGE FORMING APPARATUS

BACKGROUND OF THE INVENTION

The present invention relates to a printer or similar image forming apparatus and, more particularly, to an image forming apparatus which allows each image component of particular color to be transferred to a medium in accurate register with the others by preventing image data of respective colors from being written at different timings and maintaining an image transfer position on the medium constant.

It is a common practice with an analog black-and-white copier to uniformly charge a photoconductive element being rotated by a corona discharger, exposes the charged element imagewise by an exposing device to electrostatically form a latent image, develop the latent image by a developing unit storing a black toner, and then transfer the resulting toner image to a sheet. In the case of an analog color copier, the uniformly charged surface of the photoconductive element is sequentially exposed to color components constituting a document image to form corresponding latent images. These latent images are each developed by a developer of associated color, and the resulting toner images are transferred to a sheet one over the other. An encoder is mounted on the drive shaft of the photoconductive element to generate basic pulses in association with the rotation of the shaft. In response to the basic pulses, a controller controls the sequence of various sections included in the copier by, for example, incrementing a counter having a timer function.

In a digital black-and-white copier, an image scanner scans a document image to generate digital image data. A photoconductive element is rotated and uniformly charged by a corona discharger. An optical writing unit modulates a laser beam by image data fed from the image scanner and writes the modulated image data on the charged photoconductive element by scanning it in the main scanning direction. As a result, an electrostatic latent image is formed on the photoconductive element. The latent image is developed by a developing unit storing a black toner and then transferred to a sheet. On the other hand, in a digital color copier, an image scanner reads color components constituting a document image while digitizing the resulting image data. An optical writing unit sequentially modulates a laser beam by the image data of respective colors fed from the image scanner so as to write them on a photoconductive element by scanning it in the main scanning direction. The resulting latent images of respective colors are each developed by associated one of toners of different colors. Toner images produced by such a procedure are sequentially transferred to a sheet one over the other to complete a single color image.

Japanese Patent Laid-Open Publication No. 242471/1987 discloses a laser beam printer having a plurality of laser units, and a plurality of photoconductive elements each being associated with one of the laser units. Laser beams issuing from the laser units are manipulated by respective polygonal rotary members which are driven by exclusive motors, thereby scanning the associated photoconductive elements to record a color image. In this laser beam printer, the rotating surfaces of each polygonal member are positioned perpendicular to the polar direction of the associated motor. Write control means controls the writing of image data on each photoconductive element in response to predetermined signals of predetermined period derived from one of the polygonal members.

On the other hand, Japanese Patent Laid-Open Publication No. 70265/1988 teaches a control device for a color copier. The control device generates a reference signal in synchronism with the rotation of a photoconductive element so as to define a reference position for starting forming a latent image. When the photoconductive element reaches a predetermined angular position as determined on the basis of the reference signal, an optical scanning mechanism is started up to maintain the element and the mechanism in a predetermined synchronous relation with respect to the start-up timing.

Assume that the sequence control system described in relation to the analog copier is applied to the digital copier. Then, since the basic pulses are not synchronous to the main scanning lines of the laser beam, the timing for writing read image data is apt to deviate by one line at maximum. Such a deviation would shift the position where image data should be written. Specifically, when a plurality of toner images sequentially formed on the photoconductive element are to be transferred to a sheet one above the other, the sheet is driven at a timing synchronous to the rotation of the element and, therefore, the images written on the element at deviated positions are directly transferred to the sheet. As a result, the toner images are brought out of register on the sheet. This is not critical as far as the black-and-white copier is concerned. However, when it comes to a color copier, the toner images of respective colors are brought out of register due to the positional deviation of the image data, critically degrading the quality of the resulting color image.

The laser beam printer of the type controlling the writing of image data on all of the photoconductive elements in synchronism with predetermined signals derived from one polygonal member as stated above has the following problem. Since the signals of predetermined period derived from one polygonal member involve an error due to irregularities in the rotation of the member, an error is introduced in the writing of image data to cause the image components of respective colors to deviate. This also lowers the quality of the resulting color image.

Further, the control device for a color copier described above has a drawback that the synchronous relation between the photoconductive element and the optical scanning mechanism is affected by an error occurring in the drive of the scanning mechanism. This also introduces an error in the writing of image data and thereby degrades the quality of a color image.

SUMMARY OF THE INVENTION

It is, therefore, an object of the present invention to provide an image forming apparatus which allows image components of different colors to be transferred to a medium in accurate registration with each other by preventing the timings for writing image data from being deviated and by maintaining the image transfer position on the medium constant.

An image forming apparatus of the present invention comprises a reading unit for reading an image of a document by scanning the image a plurality of times, a synchronizing signal generating device for generating main scanning line synchronizing signals, a writing unit for sequentially writing image data generated by the plurality of times of scanning on a photoconductive element by scanning the photoconductive element in a main scanning direction in synchronism with the main scanning line synchronizing signals, thereby electrostatically forming corresponding latent images, a developing device for developing the latent images sequentially formed on the photoconductive element to produce corresponding visible images, a transfer medium driving mechanism for driving a transfer medium, a transferring device for transferring the visible images to the transfer medium being driven by the transfer medium driving mechanism one over the other, a sensor for determining that the reading unit has scanned the front edge of the document, and a controller for causing, by using the main scanning line synchronizing signals and an output signal of the sensor, at least the writing unit to start writing each of the image data and causing the transfer medium driving mechanism to drive the transfer medium for transfer of the visible image.

BRIEF DESCRIPTION OF THE DRAWINGS

The above and other objects, features and advantages of the present invention will become more apparent from the following detailed description taken with the accompanying drawings in which:

FIGS. 2A and 2B are timing charts representative of a specific basic operation of the embodiment;

DESCRIPTION OF THE PREFERRED EMBODIMENTS

Figure 1:
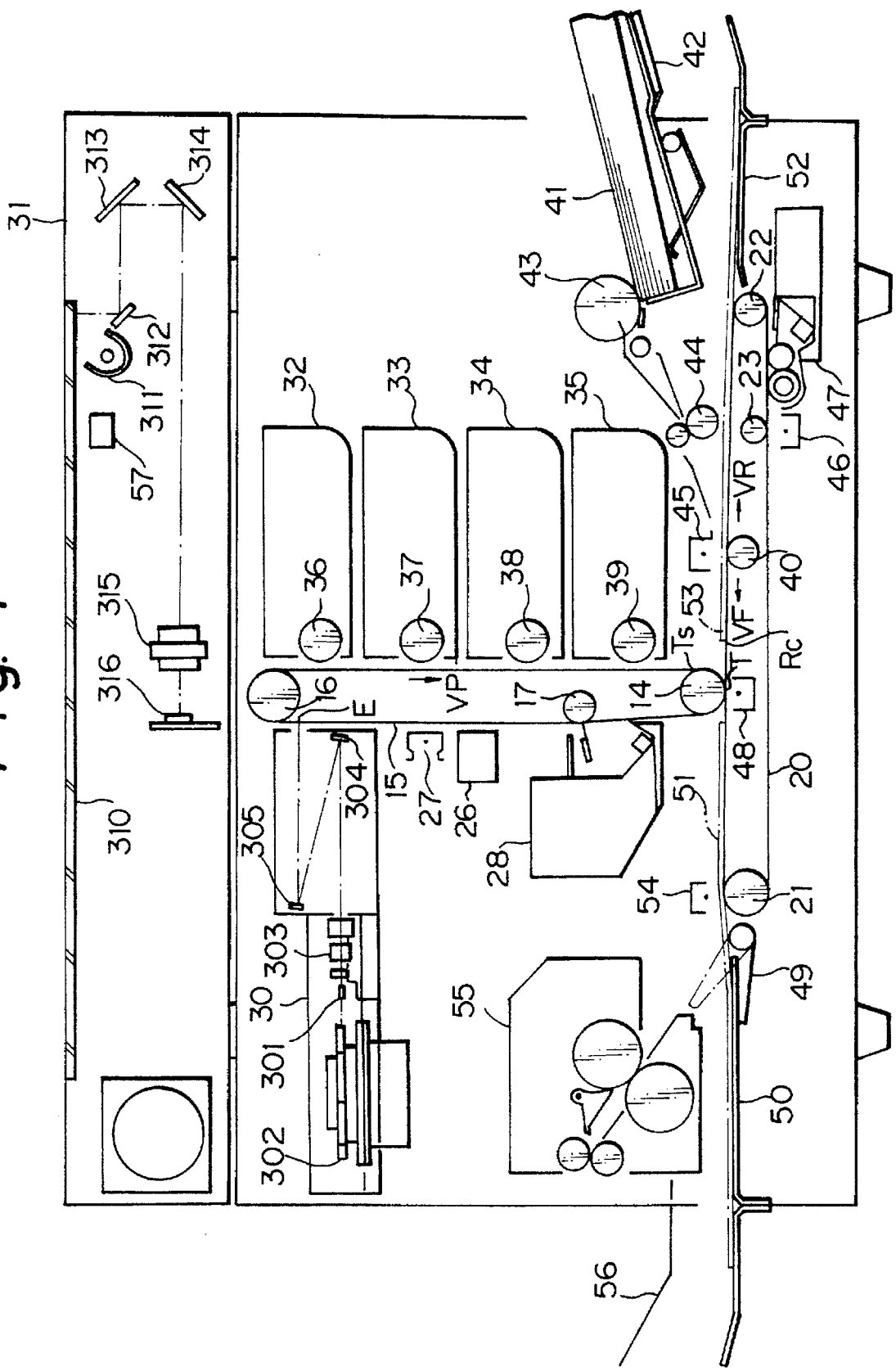
FIG. 1 is a section showing an image forming apparatus embodying the present invention.

Referring to FIG. 1 of the drawings, an image forming apparatus embodying the present invention is shown and implemented as a color image recorder by way of example. As shown, when a print switch, not shown, provided on the color recorder is pressed, a print start signal a, FIG. 2A, is applied to a main board or main controller 11 shown in FIG. 3 and implemented by a microcomputer. In response, the main control board 11 causes a servo control board or servo controller 12 to start driving a motor 13. The motor 13 drives a drive roller 14 clockwise. A photoconductive element in the form of a belt 15 is passed over the drive roller 14 and rollers 16 and 17. As a result, the belt 14 is driven by the roller 14 in a direction indicated by an arrow in the figure at a linear velocity of VP. At the same time, the main board 11 causes another servo control board or servo controller 18 to drive a motor 19 associated with a sheet transport belt which will be described.

First, the motor 19 is rotated in the forward direction, as represented by signals g, h and i, FIG. 2A. A drive roller 21 is rotated by the motor 19 to in turn rotate a sheet transport belt 20 in a direction indicated by an arrow in the figure at a linear speed of VF in cooperation with driven rollers 22 and 23. The servo controllers 12 and 18 control respectively the photoconductive belt 15 and the sheet transport belt 20 such that the linear velocities VP and VF are equal to each other. Specifically, encoders 24 and 25 are mounted on the motors 13 and 19, respectively. The servo controllers 12 and 18 control respectively the rotation of the belt 15 and that of the belt 20 in response to the outputs of the encoders 24 and 25.

As shown in FIG. 1, the photoconductive belt 15 is discharged by a discharger 26 and then uniformly charged by a charger 27 under the following conditions (1)–(3).

(1) After a toner remaining on the belt 15 has been removed by a cleaning unit 28, the discharger 28 reduces the surface potential of the belt 15 substantially to zero volt by illumination or corona discharge.

(2) In the event of negative-to-positive development, i.e., when a negative latent image on the belt 15 is to be converted to a positive toner image, the charger 27 uniformly charges the entire surface of the belt 15 since the toner will deposit on uncharged portions of the belt 15.

Figure 3:
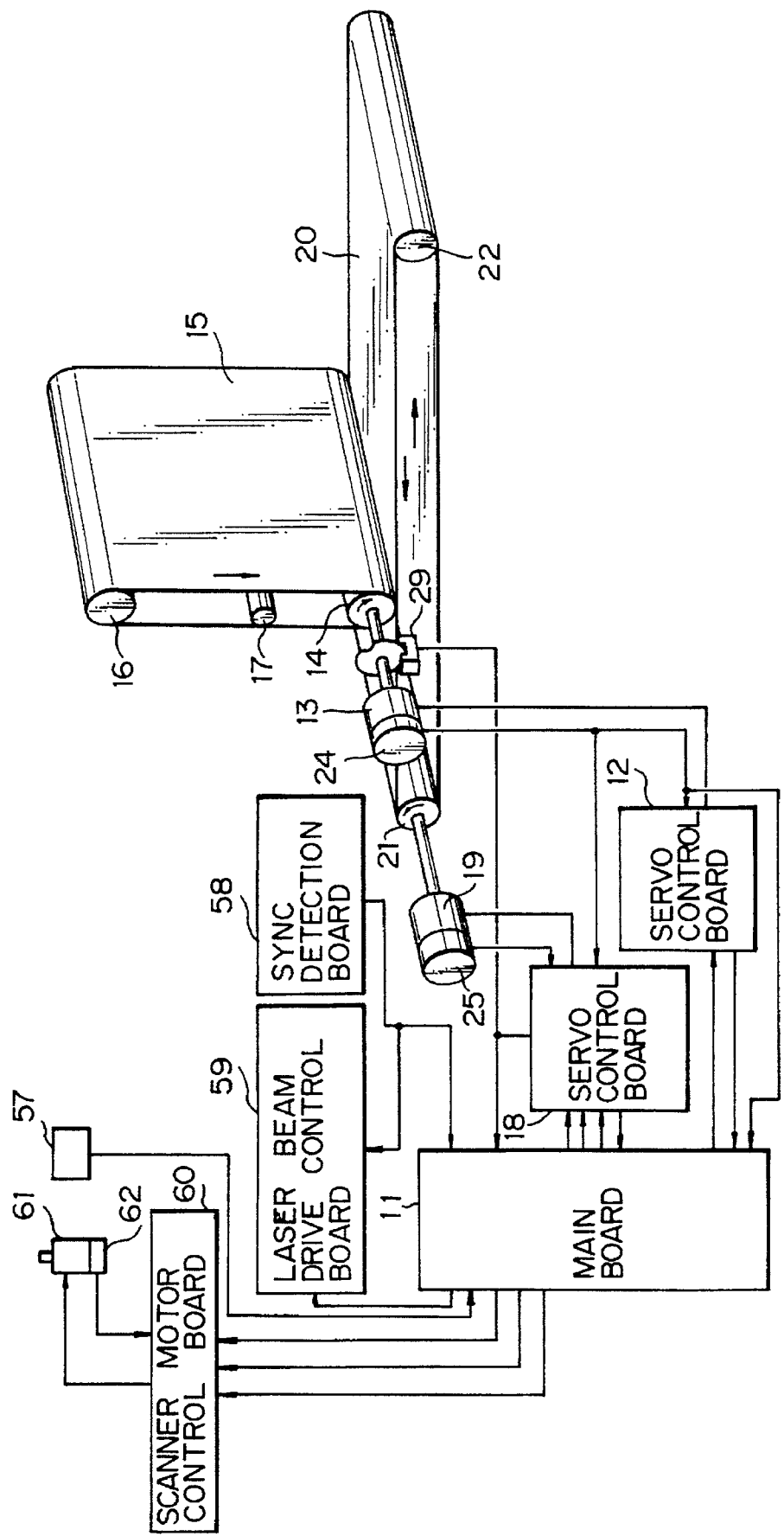
FIG. 3 is a block diagram schematically showing a drive control arrangement included in the embodiment.

(3) While the charger 27 charges the surface of the belt 15 by corona discharge, it produces a small amount of ozone, Although such ozone will decompose soon after the corona discharge, it adversely influences the surface of the belt 15, i.e., prevents a clear-cut image from being formed on the belt 15. To eliminate this problem, air is blown or sucked from the rear of the charger 27 by a fan or similar implement, As shown in FIG. 3, a rotation sensor 29 is mounted on the shaft of the drive roller 14. The rotation sensor 29 generates a single pulse for each rotation of the drive roller 14, as represented by a signal d, FIG. 2A. In FIG. 2A, a semiconductor laser included in an optical writing unit 30, FIG. 1, begins to be controllably driven when the third pulse appears from the rotation sensor 29. The semiconductor laser may be replaced with any other kind of laser, a light emitting diode (LED) array, a liquid crystal array, etc., if desired. To begin with, the writing unit 30 forms an electrostatic latent image on the belt 15 in response to yellow (Y) image data. Specifically, the writing unit 30 modulates a semiconductor laser 301 by image data, manipulates the resulting beam from the semiconductor laser 301 by a polygonal mirror or deflector 302 in the main scanning direction, and then directs it toward the belt 15 which is moving in the subscanning direction via a lens 303 and mirrors 304 and 305. Driven by an exclusive motor, the polygonal mirror 302 deflects the modulated output of the semiconductor laser 301 to thereby scan the belt 15 in the main scanning direction.

A color image scanner, generally 31, is mounted on the top of the image recorder, or copier. The color image scanner 31 scans a document three consecutive times to read it in three separated colors, e.g., blue, green and red. The color signals from the scanner 31 are converted to Y, M (magenta), C (cyan) and BK (black) image data and sequentially applied to the writing unit 30.

If desired, the color data for the writing unit 30 may be fed from a color image processing unit independent of the color image scanner 31, e.g., a color facsimile transceiver, word processor or personal computer. This can be done if an extra connection interface is used. The color image scanner 31 illuminates a document laid on a glass platen 310 with a light source 311, focuses a reflection from the document onto a CCD (Charge Coupled Device) image sensor 316 via mirrors 312–314 and a lens 315, while moving movable optical elements 311–314 to scan the document. The scanner 31 repeats such a document reading operation three times while separating the light image incident on the image sensor 316 with filters. A document edge sensor 57 is comprised of a photosensor, for example, and responsive to a shield plate or a reflector, not shown, movable integrally with the optical elements 311–314, thereby determining the time when the elements 311–314 have scanned the front edge of the document.

Developing units 32, 33, 34 and 35 are used to develop latent images associated with respective color components by associated Y, M, C and BK toners. Usually, the developing units 32–35 are positioned such that developing rollers 36–39 thereof do not contact the photoconductive belt 15. The developing units 32–35 are each pressed to the left in FIG. 1 to remain in contact with the belt 15 only from the time when the latent image of associated color reaches the roller 36, 37, 38 or 39 thereof to the time when the former moves away from the latter. In such a developing position, the developing units 32–35 develop the latent images of respective colors, as represented by signals m–p in FIG. 2B.

A Y latent image formed on the belt 15 is developed first. Specifically, the Y developing unit 32 is driven in synchronism with the movement of the belt 15 so as to convert the Y latent image to a Y image by a Y toner. A switching roller 40 is movable in the up-and-down direction to move the paper transport belt 20 into and out of contact with the belt 15 at an image transfer position (where the drive roller 14 is located). On the start of printing, the belt 20 is driven in the previously mentioned direction, and then the switching roller 40 is moved upward to urge the belt 20 against the belt 15, as represented by a signal t in FIG. 2B. At a predetermined time, a transfer medium in the form of a sheet 41 is fed from a cassette 42 by s pick-up roller 43. A register roller 44 once stops the movement of the sheet 41 and then drives it toward the image transfer position at a timing which allows the sheet 41 to meet the image on the belt 15. An adhesion charger 45 causes the sheet 41 to adhere to the belt 20 by corona charge of predetermined polarity, as indicated by a signal x in FIG. 2B. This is successful in preventing the sheet 41 from being dislocated during image transfer. At this instant, the switching roller 40 also plays the role of a counter electrode for the charger 45, thereby simplifying the construction. It is to be noted that the entire surface of the belt 20 is discharged by a corona generator 46 (signal w in FIG. 2B) and then cleaned by a cleaner 47 before the transfer of the toner image of the first color.

Assume that the leading edge of the Y image on the belt 15 reaches a point Ts a predetermined distance short of the image transfer position, i.e., a point T. Then, a motor forward signal S1 is fed from the main board 11 to the servo control board 18, as represented by a signal h in FIG. 2A. Here, at the time when the signal S1 arrives at the servo control board 18, the motor 19 has already been rotated. Hence, the motor 19 continues to rotate in the forward direction, as indicated by a signal j in FIG. 2A. At the time when the signal S1 appears, the leading edge of the sheet 41 has arrived substantially at a point Tt which is short of the point T by a distance $1_1$, and the leading edge of the Y image on the belt 15 has reached the point Ts also short of the point T by the distance $1_1$. This corresponds to four rotations of the drive roller 14 plus the number of output pulses $P_0$ of the encoder 24 as counted from the time when the Y image data begins to be written, as indicated by the signals d, e, f and h in FIG. 2A. During this period of time, the belt moves the distance between a point E (image writing position) and the point Ts.

When a period of time $t_1$ expires after the input of the signal S1, both the leading edge of the Y image on the belt 15 and that of the sheet 41 have moved the distance $1_1$ to the point T. As a result, the Y image is transferred from the belt 15 to the sheet 41 by a corona discharger 48. At the time $t_1$, the encoder 24 associated with the motor 13 and the encoder 25 associated with the motor 19 have generated $P_1$ pulses and $Pt_1$ pulses, respectively. This is indicated by signals e and k in FIG. 2A. Regarding the resolution, if the belts 15 and 20 move the same distance for each pulse, $P_1$ and $Pt_1$ are equal; if they move at a ratio of $\alpha$, $P_1$ and $Pt_1$ will have values based on $\alpha$. In the illustrative embodiment, let $P_1$ and $Pt_1$ be equal to each other.

As the transfer of the Y image proceeds, the leading edge of the sheet 41 is separated from the belt 20 and steered toward a lead edge guide 50 by a path selector 49 which is held in a solid line position then. At the time when the trailing edge of the sheet 41 has moved away from the point T by a distance $1_2$, i.e., when the sheet 41 has moved a distance $1_1+1_p$ (sheet size)+$1_2$ as measured from the time when the signal S1 had appeared (on the elapse of a time $t_1+t_2$), the sheet 41 is located at a position 51 indicated by dash-and-dots line in FIG. 1, Thereafter, the main board 11 causes the servo control board 18 to reverse the motor 19 by a motor reverse signal, as indicated by the signals i and j in FIG. 2A. Before the reversal of the motor 19, the switching roller 40 is lowered to move the belt 20 away from the belt 15. The belt 20 and sheet 41 carried thereon are quickly returned by the motor 19 at a speed of VR (>VF) to the right as viewed in FIG. 1. Specifically, the belt 20 and sheet 41 move rightward the same distance as at the time of leftward movement $(t_1+t_2)$ in a short time $t_3$. At this instant, the trailing edge of the sheet 41 is separated from the belt 20 and driven toward a trail edge guide 52. As the belt 20 and sheet 41 are accurately returned by the predetermined distance, the sheet 41 is brought to a stop at a position 53 indicated by dash-and-dots line in FIG. 1 (where the leading edge of the sheet 41 is located at the point Rt). In this condition, the sheet 41 waits for the transfer of the M image for a period of time $t_4$.

While the transfer of the Y image is under way, the M image is formed on the belt 15. Specifically, the writing unit 30 forms an M latent image on the belt 15 in response to M image data, The formation of the M image begins at the time when the drive roller 14 completes an integral number of rotations (four rotations) after the writing of the Y image has begun. The Y developing unit 32 is brought into contact with the Y image portion of the belt 15 and then activated. Before the leading edge of the M image portion of the belt 15 arrives at the Y developing unit 32, the unit 32 is moved away from the belt 15 and then deactivated. After the Y image portion of the belt 15 has moved away from the M developing unit 33 and before the leading edge of the M image portion arrives, the M developing unit 33 is brought into contact with the belt 15 and then driven to develop the M latent image by the M toner.

In the event when the leading edge of the resulting M image on the belt 15 reaches the point Ts, i.e., when the belt 15 rotates a distance corresponding to four rotations of the drive roller 14 plus the number of output pulses $P_0$ of the encoder 24 after the start of the M image data writing, the main control board 11 feeds a motor forward start S2 to the servo control board 18 to thereby start rotating the drive motor 19 in the forward direction. At the same time as or slightly later than this, the switching roller 40 is raised to urge the belt 20 against the bolt 15 until at least the leading edge of the sheet 41 reaches the point T.

Until the period of time $t_1$ expires after the appearance of the signal S2, the encoder 24 continuously generates $P_1$ pulses as during the transfer of the previous Y image, thereby moving the belt 15 the distance $1_1$. The main board 11 causes the servo control board 18 to control the motor 19 such that the sheet 41 is accelerated from zero speed to the speed VF (=VP), and such that the encoder 25 generates $Pt_1$ pulses as during the transfer of the Y image. As a result, the leading edge of the sheet 41 moves the distance $1_1$ in the period of time $t_1$. Therefore, the M image is transferred from the belt 15 to the sheet 41 over and in accurate register with the Y image.

The procedure described above is repeated to sequentially transfer a C image and a BK image from the belt 15 to the sheet 41. Consequently, the Y, M, C and BK images are combined on the sheet 41 to complete a single color image.

At the beginning of the transfer of the BK image, the path selector 49 is switched over to a position indicated by a dash-and-dot line in FIG. 1. As a result, the sheet 41 to which the BK image is being transferred is steered by the path selector 49 toward a fixing unit 55 while being discharged by a sheet separation discharger 54. Even after the transfer of the entire BK image, the main board 11 continuously causes the servo control board 18 to rotate the motor 19 forward. Hence, the sheet 41 is continuously transported to the left in the figure. Consequently, the sheet 41 has the color image thereof fixed by the fixing unit 55 and is then driven out to a tray 56 as a color printing (see signals u, v and y, FIG. 2A). The corona generator 46 begins to uniformly discharge the belt 20 when the trailing edge of the image portion of the first sheet 41 moves away from the corona generator 46, as represented by a signal w, FIG. 2B.

Assume that color images are to be recorded in succession in a repeat mode, as shown in FIGS. 2A and 2B. Then, after the first BK image data has been written on the belt 15, the second Y image data is written. The belt 20 and the next sheet are moved in the same manner as during the recording with the first sheet. Such a procedure is repeated to complete another color image on the next sheet.

After the image transfer, the toner remaining on the belt 15 is removed by the cleaning unit 28. Then, the belt 15 is moved toward the charger 27. Finally, the last color printing is driven out to the tray 56 while the belts 15 and 20 are cleaned and discharged and thereby initialized.

While the above description has concentrated on four color images, i.e., Y, M, C and BK images, only two or three color images may, of course, be transferred to a sheet one above the other. In such a case, the various sections of the image recorder will be so controlled as to repeat the formation and transfer of an image twice of three times.

When a monocolor image is desired, one of the developing units 32–35 matching the desired color is driven in contact with the belt 15 until a desired number of images have been recorded. At the same time, the belt 20 is held in contact with the belt 15 while the path selector 49 is maintained in the position for steering sheets toward the fixing unit 55. Hence, in the repeat mode, the time necessary for a single printing to be produced in four colors is ¾ times as long as the time associated with three colors, twice as long as the time associated with two colors, and four times as long as the time associated with a single color. Of course, the four colors shown and described may be replaced with blue, green, red, etc.

Figure 4:
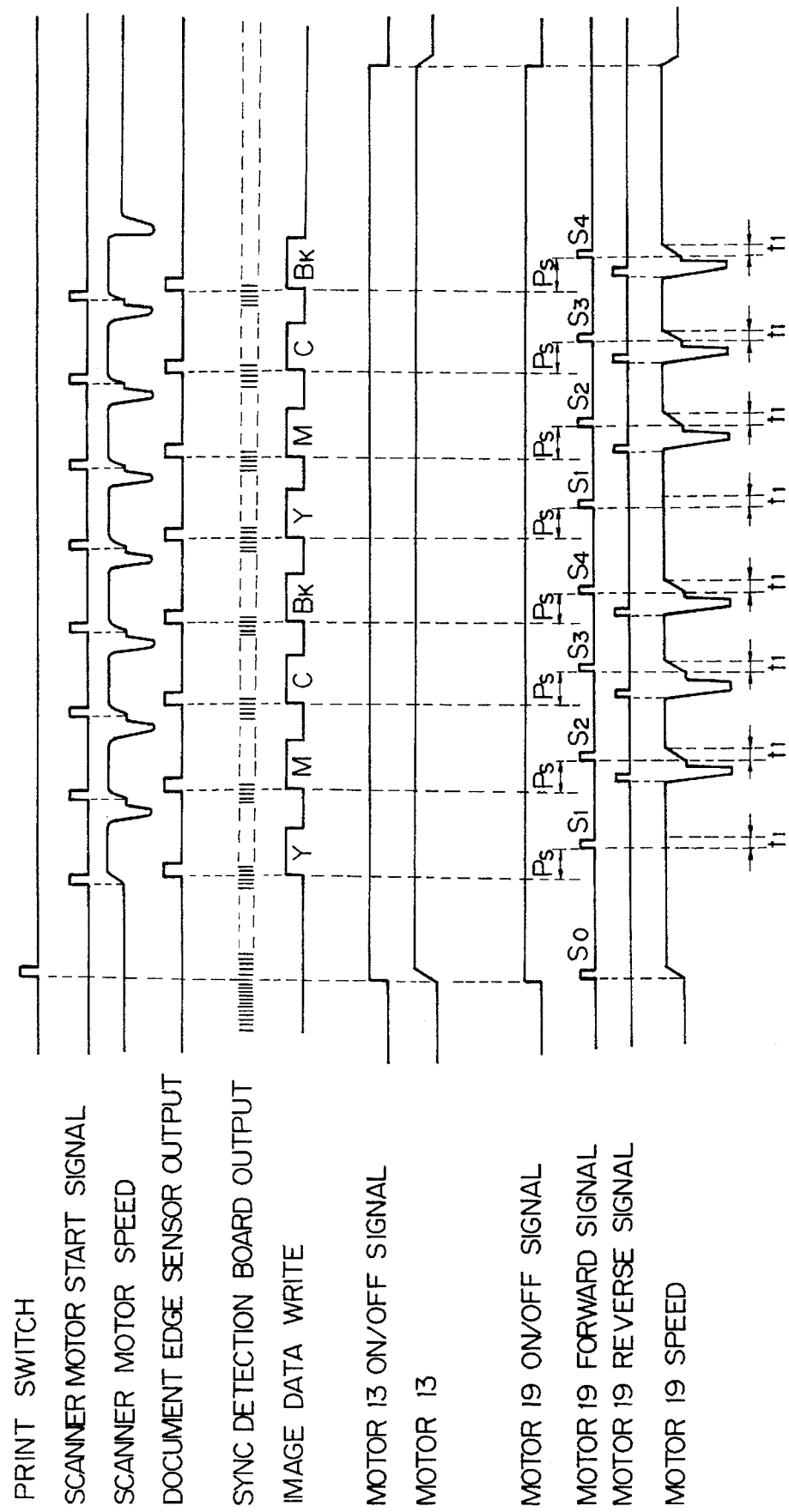
FIGS. 4 and 5 are timing charts indicative of the operation timings of the embodiment.

The operation of the embodiment will be described with reference to FIGS. 4 and 5. As shown in FIG. 3, a synchronization (abbreviated as sync hereinafter) detection board 58 plays the role of means for generating a main scanning line sync signal and sends a main scanning line sync signal to the main board 11 and a laser beam drive control board 59. In response, the laser beam drive control board 59 controls the drive of the polygon mirror of the writing unit 30 such that it manipulates the output beam of the semiconductor laser in synchronism with the main scanning line sync signal.

One of important features of the this embodiment is that at least the time for starting writing image data and the time for starting driving the sheet transport belt motor 19 are controlled during image formation on the basis of the main scanning line sync signal from the sync sensor 58 and the output of the document edge sensor 57.

Specifically, when the print switch is pressed, the main board 11 causes the servo control board 12 to start driving the motor 13 while causing the serve control board 18 to start driving the motor 19. Further, the main board 11 commands a scanner motor control board 60 to start driving a scanner motor 61 by counting, for example, clock pulses which are relatively rough with respect to time or the output pulses of the encoder 24. In response, the scanner motor control board 60 starts driving the motor 61 and thereby the scanner 31. An encoder 62 associated with the motor 61 generates pulses in association with the rotation of the scanner motor 61, Receiving the output pulses of the encoder 62, the control board 60 energizes motor 61 at a predetermined time and then causes it to rotate at a constant speed. As a result, the movable elements 311–314 of the scanner 31 sequentially scan a document while moving to the left as viewed in FIG. 1. After the elements 311–314 have been accelerated to a predetermined speed, the document edge sensor 57 senses the shield plate moving integrally with the elements 311–314, i.e., determines that the front edge of the document laid on the glass platen 310 has been scanned. The resulting output of the sensor 57 is sent to the main board 11. In the illustrative embodiment, the document is located on the glass platen 310 with the front edge thereof positioned on a reference line.

Figure 5:
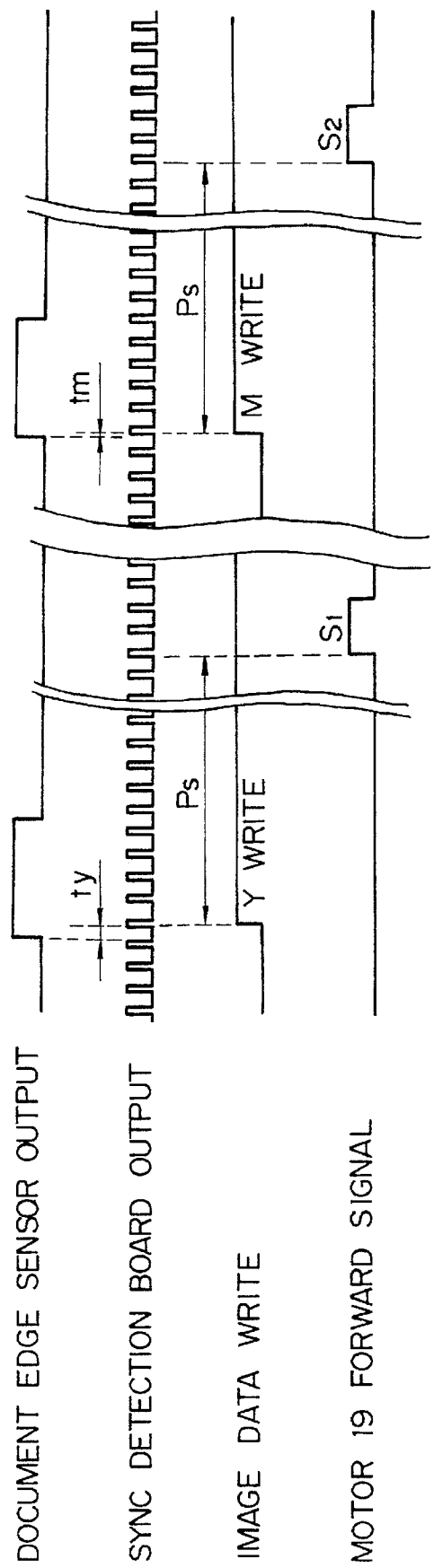

Subsequently, the document is read, the resulting image data is written, and then sheet transport belt motor 19 is driven, as shown in FIG. 5. First, while the scanner 31 reads an image of the first color (Y image), the document edge sensor 57 senses the front edge of the document and sends an edge signal $Re_1$ to the main board 11. The sync detection board 58 delivers the first main scanning line sync signal to the main board 11 on the elapse of a period of time t y after the edge signal $Re_1$. On receiving the the first sync signal, the main board 11 causes the writing unit 30 to start writing the Y image data on the belt 15. After the start of writing of the Y image data, the main board 11 receives Ps main scanning line sync signals from the sync detection board 58. Then, the main board 11 sends a motor forward signal S1 to the servo control board 18 to thereby rotate the transport belt motor 19 in the forward direction. After the appearance of the signal S1, the motor 19 is rotated forward by a predetermined amount, reversed by the same amount, and then brought to a stop, as stated earlier.

During the above period of time, the scanner 31 reads the entire image of the first color and then starts reading an image of the second color (M image). As the document edge sensor 57 again senses the front edge of the document and sends an edge signal $Re_2$ to the main board 11, the main board 11 causes the writing unit 30 to start writing the M image data in response to the first main scanning line sync signal from the sync detection board 58 which appears a time t m later than the signal $Re_2$. After the start of writing of the M image data, the main board 58 receives Ps main scanning line sync signals from the sync detection board 58. Then, the control board 58 sends a motor forward signal S2 to the servo control board 18 to thereby drive the transport belt motor 19 in the forward direction. It is to be noted that the number Ps is associated with the time when the leading edge of the image formed on the belt 15 reaches the point Ts $1_1$ $1_1$ short of the point T. On the elapse of a period of time $t_1$ after the appearance of signals S1 and S2, the belt 15 and sheet carried thereon have also moved the distance 1 Consequently, the M image is brought into accurate register with the preceding Y image.

The above procedure is repeated with an image of the third color (C image) and an image of the fourth color (BK image) to thereby complete a color printing.

Figure 6B:
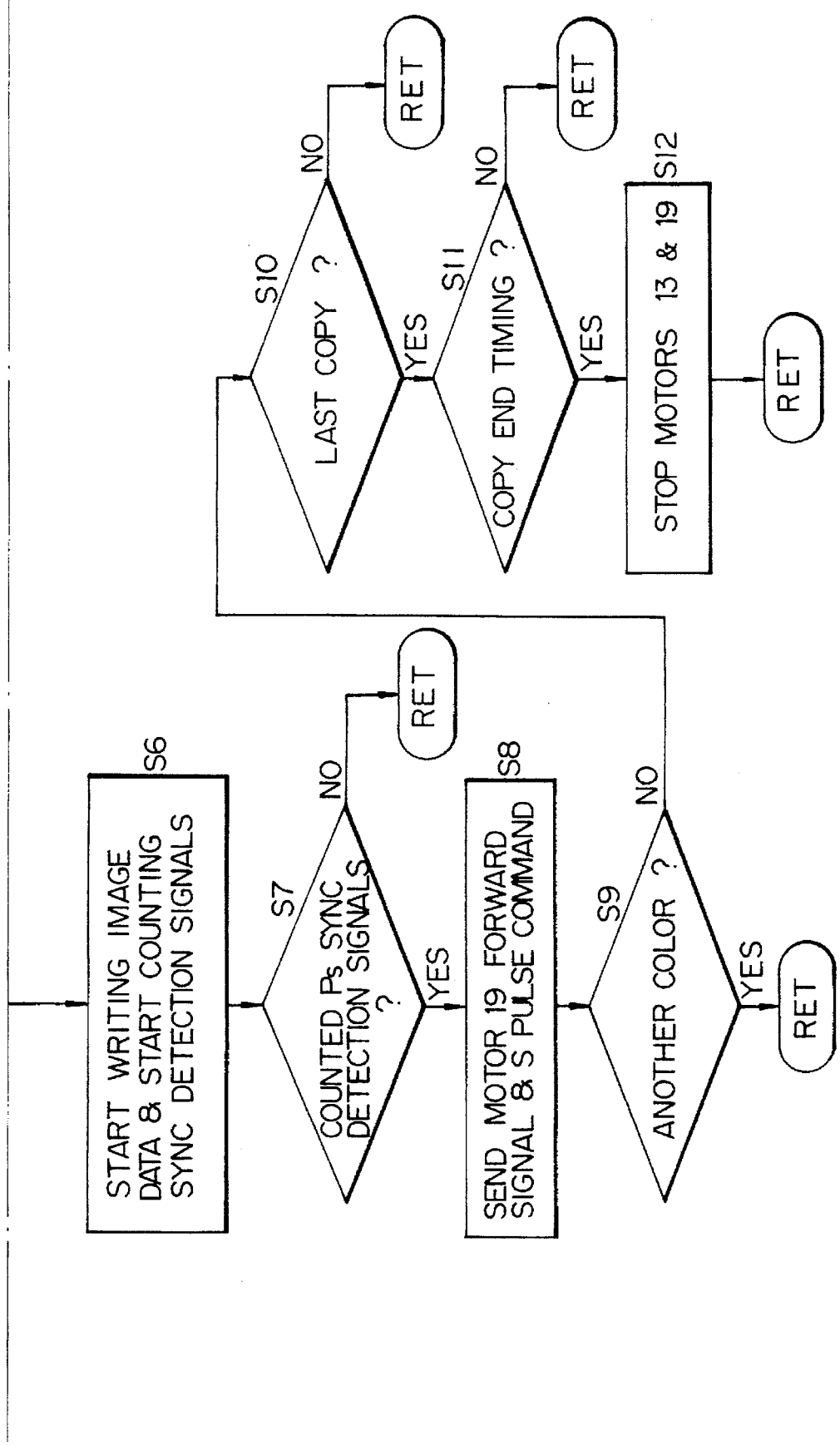
FIG. 6 is a flowchart demonstrating part of processing to be executed by a main board included in the arrangement of FIG. 3.

FIG. 6 demonstrates part of the processing executed by the main board 11. As shown, in response to a print signal from the print switch, the main board 11 causes the servo control boards 12 and 18 to start driving the motors 13 and 19, respectively (step S1). Further, at a predetermined time, the main board 11 causes the scanner motor control board 60 to start rotating the scanner motor 61 forward (S2). After receiving an edge signal from the document edge sensor 57 (S3), the main board 11 turns on a write gate in response to the first main scanning line sync signal from the sync detection board 58 to thereby cause the writing unit 30 to start writing the Y image data. At the same time, the main board 11 starts counting the first and successive main scanning line sync signals by a counter. This part of the processing is indicated in steps S4, S5 and S6.

As the counter counts Ps main scanning line sync signals (S7), the main board 11 sends a motor forward signal S to the servo control board 18 to thereby rotate the transport belt motor 19 (S8). As a result, the motor 19 is rotated by a predetermined amount, reversed in the same amount, and then stopped. The main board 11 repeats such processing with each of the specified colors. This is also true in the repeat mode. On the completion of the entire copying operation, the main board 11 causes the servo control board 12 to stop driving the motor 13 while deenergizing the motor 19 (S9–S12).

In the embodiment, the interval between the time when the sync detection board 58 generates a main scanning line sync signal and the time when the document edge sensor generates an edge signal, i.e., ty, tm, tc or tbk is not always the same throughout the Y, M, C and BK images. This is because the position where the movable elements 311–314 of the scanner 31 stop and the position thereof after the start of movement cannot always be controlled with accuracy. In addition, the period of the main scanning line sync signals from the sync detection board 58 is not fully constant due to, for example, irregularities in the rotation and configuration of the polygonal motor. However, the embodiment starts writing an image and starts driving the transport belt motor 19 for image transfer by commands which are based on the main scanning line sync signals used as basic pulses for operation timing control. Hence, the embodiment is capable of preventing image data writing timings from being deviated from one another and of maintaining an image transfer position on a medium constant. This protects the color components from deviations including one line of deviation in the main scanning direction, thereby insuring an attractive composite color image. It is to be noted that one line of deviation in the main scanning direction is 0.0635 millimeter if the recording density is 400 dots per inch.

Particularly, the main board 11 starts counting the main scanning line sync signals on receiving an edge signal from the document edge sensor 57 just after the start of forward movement of the movable elements 311–314, causes the writing unit 30 to start writing image data when the board 11 reaches a predetermined count, and drives a sheet on the basis of the time for starting writing the image data, This prevents the image data writing timing from differing from one color to another and maintains the image transfer position on a medium constant, as stated above.

Further, since the edge signal from the document edge sensor 57 is used as a reference for image formation for all of the colors, the stop position of the movable elements 311–314 and the position thereof after the start do not have to be highly accurate. Even in a monocolor mode, the registration among consecutive printings is insured with the belt 20 moved in the forward direction only.

While the embodiment has been shown and described as sequentially printing Y, M, C and BK images in this sequence and arranging the Y, M, C and BK developing units 32–35 in this order, this is only illustrative and not limitative. Further, the embodiment is implemented with a system which writes images of respective colors by a light beam in response to digitized image data. Alternatively, an analog light image customary with an ordinary electrophotographic copier may be focused onto the point E at a predetermined time, if necessary.

The embodiment begins to write an image of particular color in response to the first main scanning line sync signal appeared after the appearance of associated one of the edge signals $Re_1$–$Re_4$. However, the first main scanning sync signal is only illustrative and may be replaced with any other suitable one. A photoconductive element may be used in place of the photoconductive belt 15, if desired. The developing units 32–35 arranged one above another may be replaced with a conventional revolver type developing device having the units 32–35 arranged around a rotatable shaft therein.

The main scanning line sync signal generating means is implemented as the sync detection board 58. Alternatively, in a recorder of the type using an LED array, liquid crystal array or similar fixed optical writing device, the main scanning line sync signal may be constituted by a pulse train to be generated by a reference oscillator incorporated in the main board 11.

Figure 7:
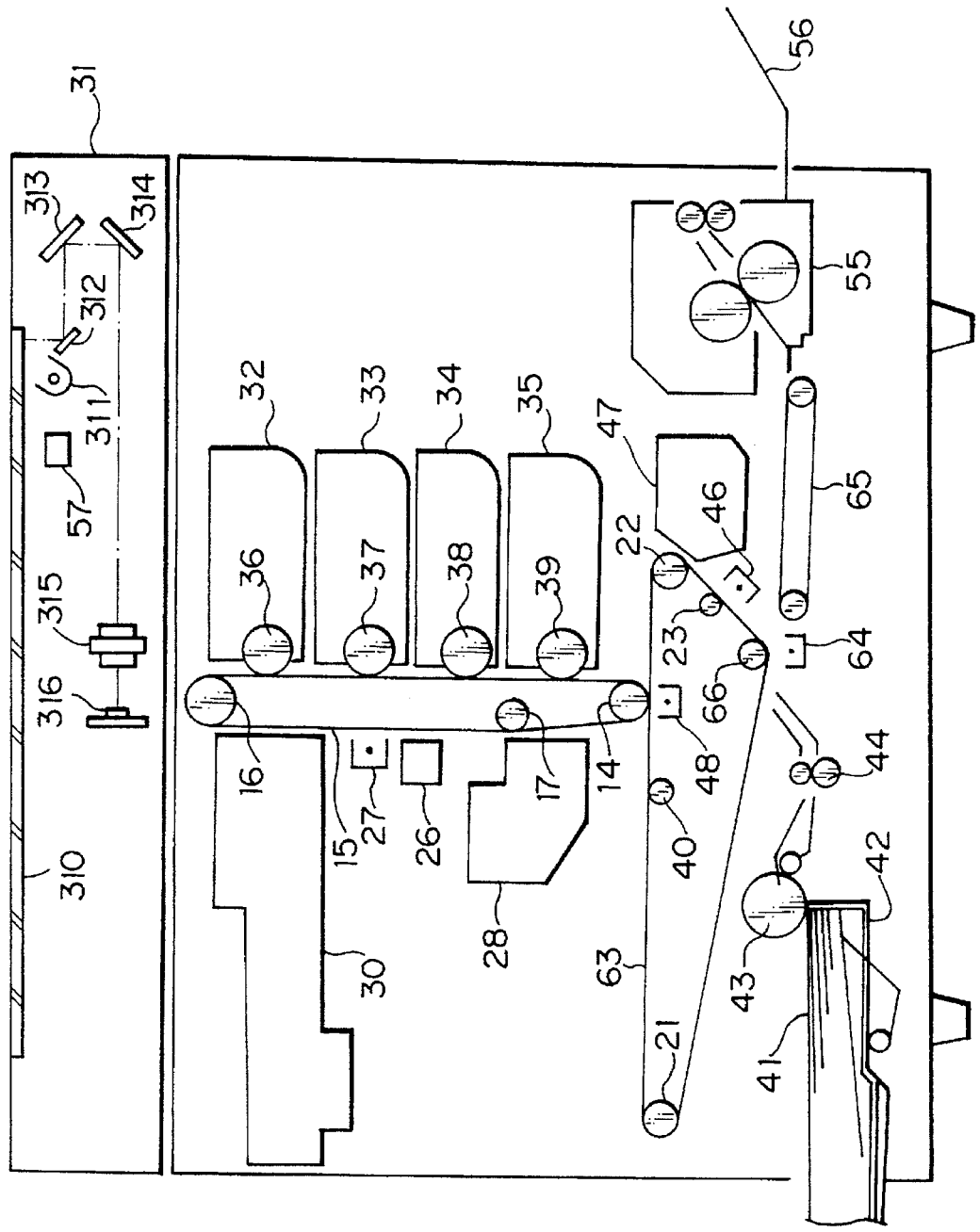
FIG. 7 is a section showing an alternative embodiment of the present invention.

Referring to FIG. 7, an alternative embodiment of the present invention will be described. As shown, an intermediate transfer belt 63 is used as a transfer medium in place of the sheet transport belt 20 and passed over rollers 21–23 and 66. Y, M, C and BK images sequentially formed on the photoconductive belt 15 are transferred to the intermediate transfer belt 63 one over another to complete a composite color image. Again, the switching roller 40 is movable in the up-and-down direction to move the belt 63 into and out of contact with the belt 15. The belt 63, like the belt 20, is movable in a reciprocating motion.

As a sheet 41 is fed by the register roller 44, the composite color image formed on the intermediate transfer belt 63 is transferred to the sheet by a transfer corona discharger 64 and then transported to the fixing unit 55 by a belt 65. After the color image has been fixed on the sheet 41 by the fixing unit 55, the sheet 41 is driven out to the tray 56 as a color printing. After the image transfer, the belt 63 is entirely discharged by the corona generator 46 and then cleaned by the cleaner 47. In this embodiment, the belt 63 is driven by an exclusive motor, not shown. This motor is driven by the main board 11 via the servo control board 18 in the same manner as the motor 19.

Figure 8A:
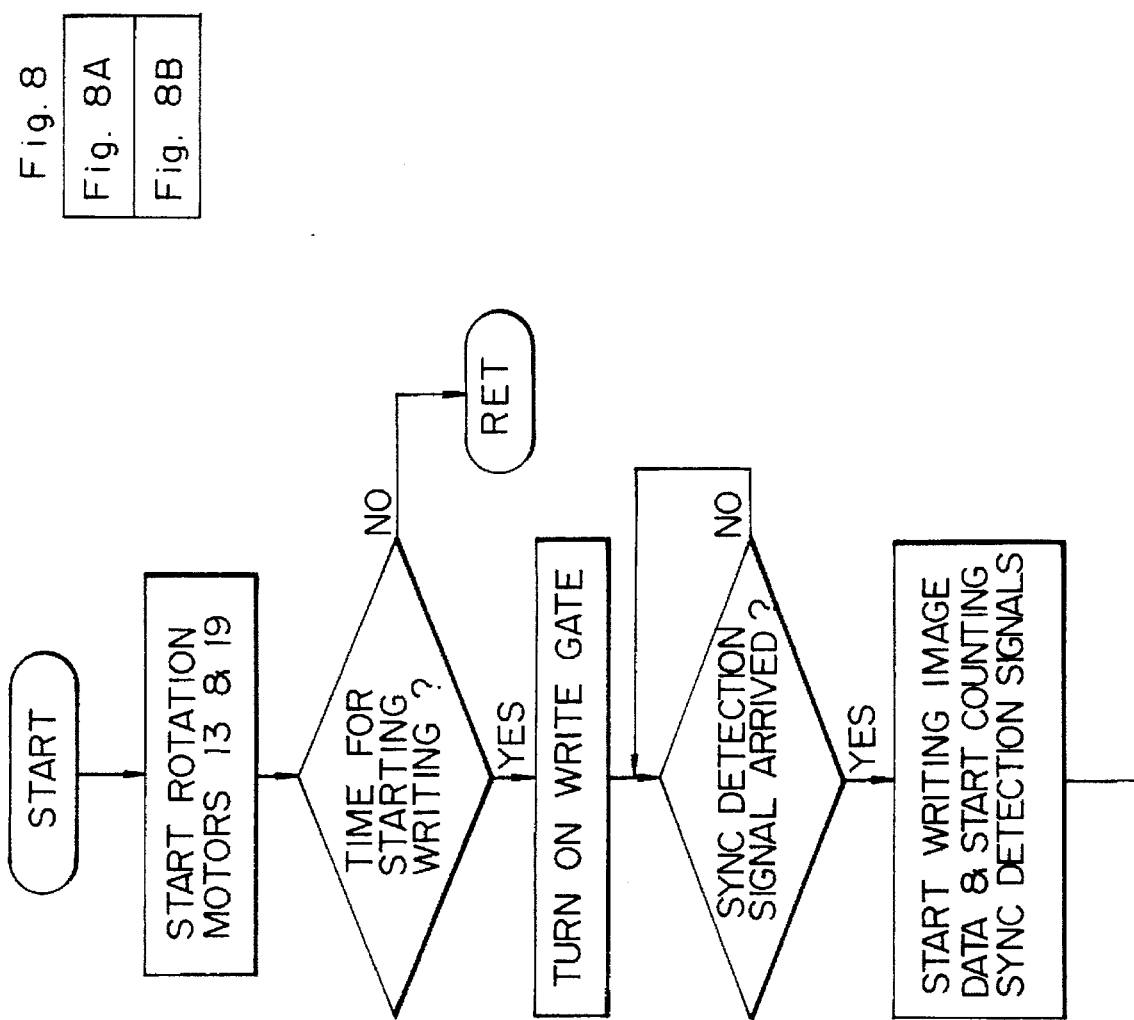
FIG. 8 is a flowchart showing part of processing to be executed by a main board and representative of another alternative embodiment of the present invention.
Figure 8B:
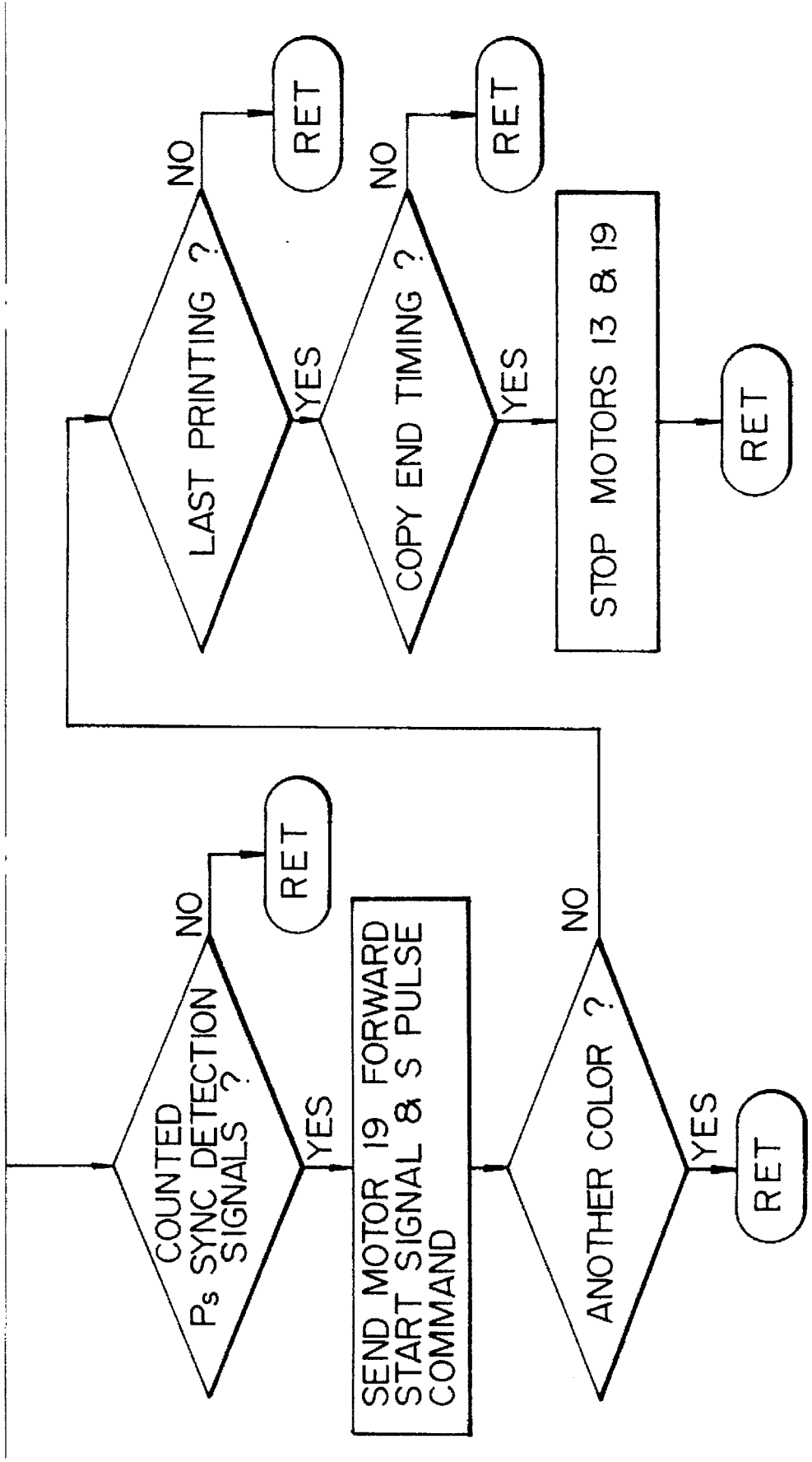

FIG. 8 shows part of processing to be executed by a main board and representative of another alternative embodiment of the present invention. This embodiment is implemented as a color printer lacking the color image scanner 31. Specifically, image data is sent from an independent image data signal source, not shown, to the printer via an interface, not shown, and written on the belt 15 by the writing unit 30. In response to a print start signal from the print switch, the main board 11 causes the servo control boards 12 and 18 to start driving the motors 13 and 19, respectively. Since the image scanner 31 and, therefore, the scanner motor 61 is absent, the edge signal from the document edge sensor 57 is also absent. In the embodiment, therefore, a write start timing signal replacing the edge signal is generated by, for example, a counter built in the main board 11 at a predetermined timing. Then, the main board 11 will turn on the write gate in response to the first main scanning line sync signal appeared after the write start timing signal. The rest of the operation is the same as in the previous embodiments.

The illustrative embodiment starts counting the main scanning line sync signals every time the writing means starts writing image data, and then starts driving the transfer medium as soon as the count reaches predetermined value. As a result, the drive of the transfer medium begins when the number of main scanning line sync signals started to be count simultaneously with the start of writing reaches predetermined one. This prevents the write timing from being deviated by one line at maximum and thereby eliminates an error ascribable to the deviation. Hence, there can be produced an attractive color image free from the misregistration of colors.

In summary, it will be seen that the present invention provides an image forming apparatus which prevents the timing for writing image data from differing from one color to another and maintains the image transfer position on a transfer medium constant at all times, This surely eliminates positional deviations including one line of deviation in the main scanning direction, thereby freeing a color image from the misregistration of colors.

Various modifications will become possible for those skilled in the art after receiving the teachings of the present disclosure without departing from the scope thereof.

What is claimed is:

1. An image forming apparatus comprising:

reading means for reading an image of a document by scanning said image a plurality of times;

synchronizing signal generating means for generating main scanning line synchronizing signals;

writing means for sequentially writing image data generated by the plurality of times of scanning on a photoconductive element by scanning said photoconductive element in a main scanning direction in synchronism with said main scanning line synchronizing signals, thereby electrostatically forming corresponding latent images;

developing means for developing the latent images sequentially formed on the photoconductive element to produce corresponding visible images;

transfer medium driving means for driving a transfer medium;

transferring means for transferring the visible images in overlapping relationship to said transfer medium being driven by said transfer medium driving means;

sensing means for determining that said reading means has scanned a first edge of the document, said first edge being scanned in a direction parallel to the main scanning direction and perpendicular to a sub-scanning direction; and control means for causing, by using said main scanning line synchronizing signals and an output signal of said sensing means, at least said writing means to start writing each of the image data and causing said transfer medium driving means to drive said transfer medium for transfer of the visible image, so that starting of writing is synchronized in the sub-scanning direction with sensing of the first edge of the document upon plural scannings of the first edge of the document.

2. An apparatus as claimed in claim 1, wherein said transfer medium comprises an intermediate transfer belt, said intermediate transfer belt being driven in a reciprocating motion by said transfer medium driving means for thereby transferring the image data in overlapping relationship.

3. An apparatus as claimed in claim 1, wherein said main scanning line synchronizing signals are divided in frequency and then counted by said control means.

4. An image forming apparatus comprising:

reading means movable in a reciprocating motion for reading an image of a document by scanning said document while moving in a forward direction;

synchronizing signal generating means for generating main scanning line synchronizing signals;

writing means for writing image data generated by said reading means on a photoconductive element by scanning said photoconductive element in a main scanning direction in synchronism with said main scanning line synchronizing signals, thereby electrostatically forming a latent image;

developing means for developing the latent image to convert said latent image to a visible image;

transfer medium driving means for driving a transfer medium;

transferring means for transferring the visible image to said transfer medium being driven by said transfer medium driving means;

sensing means for determining that said reading means has scanned a first edge of the document, said first edge being scanned in a direction parallel to the main scanning direction and perpendicular to a sub-scanning direction; and control means for starting counting said main scanning line synchronizing signals when a sense output of said sensing means appears immediately after a start of a reciprocating motion of said reading means, causing said writing means to start writing the image data on counting a predetermined number of main scanning line synchronizing signals, and causing said transfer medium driving means to drive said transfer medium on the basis of the time when said writing means starts writing said image data, so that starting of writing is synchronized in the sub-scanning direction with sensing of the first edge of the document upon plural scannings of the first edge of the document.

5. An apparatus as claimed in claim 4, wherein said main scanning line synchronizing signals are divided in frequency and then counted by said control means.

6. An apparatus as claimed in claim 4, wherein said transfer medium comprises an intermediate transfer belt, said intermediate transfer belt being driven in a reciprocating motion by said transfer medium driving means to transfer consecutive image data to said intermediate transfer belt one above the other.

7. An apparatus as claimed in claim 1, wherein said synchronizing signal generating means is an independent, periodic clock circuit.

* * * * *